United States Patent
Yonezawa et al.

(10) Patent No.: US 11,498,546 B2
(45) Date of Patent: Nov. 15, 2022

(54) HYBRID VEHICLE AND METHOD OF COOLING TURBOCHARGER

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 16/798,672

(22) Filed: Feb. 24, 2020

(65) Prior Publication Data

US 2020/0290593 A1    Sep. 17, 2020

(30) Foreign Application Priority Data

Mar. 14, 2019    (JP) .............................. JP2019-047254

(51) Int. Cl.
| | | |
|---|---|---|
| *B60W 20/15* | (2016.01) | |
| *B60K 6/24* | (2007.10) | |
| *B60K 6/26* | (2007.10) | |
| *B60K 6/28* | (2007.10) | |
| *B60W 20/40* | (2016.01) | |
| *F01P 5/12* | (2006.01) | |
| *B60W 10/06* | (2006.01) | |
| *B60W 10/08* | (2006.01) | |
| *B60W 10/30* | (2006.01) | |
| *F02B 39/00* | (2006.01) | |

(52) U.S. Cl.
CPC ............... *B60W 20/15* (2016.01); *B60K 6/24* (2013.01); *B60K 6/26* (2013.01); *B60K 6/28* (2013.01); *B60W 10/06* (2013.01); *B60W 10/08* (2013.01); *B60W 10/30* (2013.01); *B60W 20/40* (2013.01); *F01P 5/12* (2013.01); *F02B 39/005* (2013.01)

(58) Field of Classification Search
CPC ...... B60W 20/15; B60W 10/06; B60W 10/08; B60W 10/30; F02B 39/005
USPC .................................................. 701/112, 113
See application file for complete search history.

(56) References Cited

U.S. PATENT DOCUMENTS

| | | | |
|---|---|---|---|
| 2008/0223317 A1 | 9/2008 | Shintani et al. | |
| 2010/0038157 A1* | 2/2010 | Oba ....................... | B60K 6/547 180/65.21 |

(Continued)

FOREIGN PATENT DOCUMENTS

| | | |
|---|---|---|
| CN | 104284821 A | 1/2015 |
| CN | 107084056 A | 8/2017 |

(Continued)

*Primary Examiner* — Robert A Werner
(74) *Attorney, Agent, or Firm* — Sughrue Mion, PLLC

(57) ABSTRACT

When a prescribed execution condition is satisfied at the time of transition from HV traveling (that is, traveling performed by an engine and a motor with generation of traveling driving force by the engine) to EV traveling (that is, traveling performed by the motor without generation of traveling driving force by the engine), a controller of a hybrid vehicle performs motoring (or a self-sustaining operation) of an engine and thereafter stops the engine.

15 Claims, 11 Drawing Sheets

(56) References Cited

U.S. PATENT DOCUMENTS

| | | |
|---|---|---|
| 2011/0231081 A1 | 9/2011 | Suzuki et al. |
| 2012/0208672 A1* | 8/2012 | Sujan ................. B60W 30/188 |
| | | 180/65.265 |
| 2012/0271535 A1* | 10/2012 | Gamberoni ......... F02N 11/0829 |
| | | 701/110 |
| 2014/0343780 A1* | 11/2014 | Suzuki ............ B60W 30/18127 |
| | | 701/22 |
| 2015/0134166 A1 | 5/2015 | Aoki |
| 2019/0184968 A1* | 6/2019 | Jang ....................... B60K 6/485 |
| 2019/0186292 A1* | 6/2019 | Lee ........................... F01P 3/20 |
| 2020/0290593 A1* | 9/2020 | Yonezawa ............. B60W 10/08 |

FOREIGN PATENT DOCUMENTS

| | | | |
|---|---|---|---|
| JP | 58-176432 A | | 10/1983 |
| JP | 2002276411 A | * | 9/2002 |
| JP | 2006-275011 A | | 10/2006 |
| JP | 2012021426 A | * | 2/2012 |
| JP | 2015-058924 A | | 3/2015 |
| WO | WO2013/171841 A1 | | 11/2013 |
| WO | 2015/097522 A1 | | 7/2015 |

\* cited by examiner

<<HV TRAVELING>>

<<EV TRAVELING>>

<<STOPPED>>

HYBRID VEHICLE AND METHOD OF COOLING TURBOCHARGER

This nonprovisional application is based on Japanese Patent Application No. 2019-047254 filed with the Japan Patent Office on Mar. 14, 2019, the entire contents of which are hereby incorporated by reference.

BACKGROUND

Field

The present disclosure relates to a hybrid vehicle and a method of cooling a turbocharger in a hybrid vehicle.

Description of the Background Art

Japanese Patent Laying-Open No. 2015-58924 discloses a hybrid vehicle including a turbocharger.

SUMMARY

A hybrid vehicle includes an engine and a motor that generate traveling driving force and a power storage that supplies electric power to the motor. The hybrid vehicle can travel with traveling driving force generated by the engine and/or traveling driving force generated by the motor. The hybrid vehicle travels, for example, while switching between traveling performed by the engine and the motor with the engine generating traveling driving force (which is also referred to as "HV traveling" below) and traveling performed by the motor without generation of traveling driving force by the engine (which is also referred to as "EV traveling" below) depending on a situation. A fuel consumption rate (fuel consumption per unit travel distance) of the engine can thus be lowered.

A turbocharger includes a compressor provided in an intake air passage of the engine and a turbine provided in an exhaust passage of the engine. The turbine is rotated by receiving a flow of exhaust emitted from an engine main body and the compressor is rotated together with the turbine. As the compressor is rotated, intake air toward the engine main body is compressed and compressed air is supplied to the engine main body.

In the turbocharger, when the compressor and the turbine are rotated, a portion of coupling between the compressor and the turbine (for example, a shaft that couples the compressor and the turbine to each other) is heated by friction. As a rotation speed is higher, the shaft tends to be higher in temperature. When the temperature of the shaft is too high, seizure of the shaft occurs and the turbocharger may not normally operate. In particular, seizure is more likely in a hybrid vehicle than in a vehicle in which only the engine serves as a source of motive power for traveling (which is also generally referred to as a "conventional vehicle"). The inventors of the present application have analyzed a reason why seizure is more likely in a hybrid vehicle than in a conventional vehicle as below.

While the engine is on, the turbine of the turbocharger is heated by exhaust, whereas the compressor of the turbocharger is cooled by intake air. When the conventional vehicle is stopped, even though a driver turns off an accelerator (for example, when the driver moves his/her foot away from an accelerator pedal), the engine is not immediately stopped but keeps rotating for a while. Therefore, the turbocharger can be cooled by intake air. Since the engine is rotated under a light load, a temperature of exhaust of the engine is low. Therefore, in the conventional vehicle, the turbocharger can be cooled when it is stopped.

In the hybrid vehicle, on the other hand, when transition from HV traveling to EV traveling is made, the engine is immediately stopped. Since the engine is off during EV traveling, the turbocharger is not cooled by intake air. Therefore, in the hybrid vehicle, opportunities for cooling the turbocharger are fewer and the turbocharger tends to be high in temperature.

The present disclosure was made to solve the problem above, and an object thereof is to provide a hybrid vehicle that can suppress overheating of a turbocharger and a method of cooling a turbocharger.

A hybrid vehicle according to the present disclosure includes an engine and a motor that generate traveling driving force, a power storage that supplies electric power to the motor, and a controller that controls the engine and the motor. The engine includes an engine main body where combustion is performed, an intake air passage and an exhaust passage connected to the engine main body, and a turbocharger. The turbocharger includes a compressor provided in the intake air passage and a turbine provided in the exhaust passage. The compressor and the turbine are rotated together. When a prescribed condition (which is also referred to as an "execution condition" below) is satisfied at the time of transition from HV traveling (that is, traveling performed by the engine and the motor with generation of traveling driving force by the engine) to EV traveling (that is, traveling performed by the motor without generation of traveling driving force by the engine), the controller performs a self-sustaining operation or motoring of the engine and thereafter stops the engine.

When the execution condition is satisfied in the hybrid vehicle, a self-sustaining operation or motoring is performed before the engine is stopped so that the turbocharger can be cooled by intake air. Overheating of the turbocharger can thus be suppressed. A period for which the turbocharger is cooled by the self-sustaining operation or motoring is also referred to as an "intake air cooling period" below.

When the execution condition is satisfied at the time of transition from HV traveling to EV traveling, the controller may perform the self-sustaining operation of the engine and thereafter stop the engine. The self-sustaining operation refers to an operation state of the engine in which combustion energy of the engine is consumed for continuing rotation of the engine and traveling driving force is not output. In the self-sustaining operation, the engine is operated within a prescribed rotation speed range (which is also referred to as "self-sustaining Ne" below). Self-sustaining Ne can be set, for example, to a rotation speed low (for example, from 500 rpm to 1200 rpm) to such an extent as allowing a stable operation by the engine. Since high combustion energy is not generated during the self-sustaining operation, a temperature of exhaust of the engine is low. Therefore, a heat radiation amount of the turbocharger is large during the self-sustaining operation.

When the execution condition is satisfied at the time of transition from HV traveling to EV traveling, the controller may perform motoring of the engine and thereafter stop the engine. Since combustion is not performed in the engine during motoring, a temperature of exhaust of the engine is low. During motoring, a heat radiation amount of the turbocharger is larger than in the self-sustaining operation.

The execution condition may be satisfied always or only when a prescribed requirement (for example, a temperature requirement described below) is satisfied. When the execution condition is satisfied at the time of transition from HV traveling to EV traveling, the controller may perform any of the self-sustaining operation and motoring of the engine during EV traveling, and when the execution condition is not satisfied, the controller may perform neither of the self-sustaining operation and motoring of the engine during EV traveling.

The execution condition may include a condition that a temperature of the turbocharger is equal to or higher than a prescribed temperature (which is also referred to as a "temperature requirement" below). In other words, the execution condition may be satisfied only when a temperature of the turbocharger is equal to or higher than a prescribed temperature. It is expected that, when a temperature of the turbocharger is sufficiently low, increase in temperature of the turbocharger after transition to EV traveling does not lead to overheating of the turbocharger. The execution condition may be satisfied whenever the temperature requirement is satisfied. Alternatively, the execution condition may not be satisfied simply by fulfillment of the temperature requirement, but the execution condition may be satisfied when another requirement in addition to the temperature requirement is satisfied. The temperature of the turbocharger may be a temperature detected by a temperature sensor at one location (for example, a turbine or a shaft) of the turbocharger or an average value of temperatures detected by the temperature sensor at a plurality of locations of the turbocharger. The temperature of the turbocharger may be estimated from records of operations of the engine.

The intake air cooling period may end when a prescribed time period has elapsed since a time point of start of the self-sustaining operation or motoring or when a temperature of the turbocharger is equal to or lower than a prescribed temperature. The controller may extend a duration of the self-sustaining operation or motoring (that is, extend the intake air cooling period) as a transition temperature is higher. The transition temperature is a temperature of the turbocharger at the time when the HV traveling is quitted. The controller may set a rotation speed of the engine during the self-sustaining operation or motoring (that is, a rotation speed of the engine during the intake air cooling period) to be higher as the transition temperature is higher. The controller may extend the intake air cooling period and set a rotation speed of the engine during the intake air cooling period to be higher as the transition temperature is higher. It is expected that, as the intake air cooling period is longer and/or the rotation speed of the engine is higher, a heat radiation amount of the turbocharger during the intake air cooling period (which is also referred to as an "intake air cooling amount" below) is larger. Overheating of the turbocharger can properly be suppressed by increasing the intake air cooling amount when the temperature of the turbocharger is high.

The hybrid vehicle may further include an intercooler that cools intake air compressed by the compressor, the intercooler being arranged downstream from the compressor in the intake air passage of the engine. The intake air cooling amount is expected to increase by cooling of intake air by such an intercooler.

The hybrid vehicle may further include a pump. The turbocharger may include a housing having a coolant flow path through which a coolant for cooling the turbocharger flows. The pump may circulate the coolant through the coolant flow path. When the execution condition is satisfied at the time of transition from HV traveling to EV traveling, the controller may control the pump to circulate the coolant.

According to the configuration, the turbocharger is cooled also by circulation of coolant in addition to intake air supplied by the self-sustaining operation or motoring during the intake air cooling period. Therefore, overheating of the turbocharger can more reliably be suppressed.

The pump may be a mechanical pump driven by the engine. By adopting the mechanical pump, consumption of electric power can be suppressed.

The pump may be an electric pump. By adopting the electric pump, a load imposed on the engine during the intake air cooling period can be mitigated. The electric pump can be activated independently of the engine. The electric pump may receive supply of electric power from the power storage that supplies electric power to the motor for traveling or from another power storage.

In the hybrid vehicle, the engine main body may include a cooling water path through which cooling water that cools the engine main body flows. The cooling water path may be connected to the coolant flow path of the turbocharger. Coolant that cools the turbocharger may be cooling water. The pump that circulates coolant may be a water pump that circulates cooling water through the coolant flow path and the cooling water path. By cooling the engine and the turbocharger with the use of the water pump in common, the number of pumps can be reduced.

The hybrid vehicle may further include a first motor generator. The motor may be a second motor generator. Each of the first motor generator and the second motor generator may have a rotation shaft mechanically coupled to an output shaft of the engine with a planetary gear being interposed. When the execution condition is satisfied at the time of transition from HV traveling to EV traveling, the controller may control the first and second motor generators in coordination to perform the motoring of the engine by the first and second motor generators. According to such a configuration, the engine is connected to the motor generators with the planetary gear being interposed and the motor generators are controlled in coordination. Thus, the vehicle can perform EV traveling with appropriate traveling torque while the rotation speed of the engine is controlled to a desired rotation speed.

A method of cooling a turbocharger according to the present disclosure is performed in a hybrid vehicle described below and it includes steps A to C described below.

The hybrid vehicle includes an engine and a motor that generate traveling driving force, a power storage that supplies electric power to the motor, and a controller that controls the engine and the motor. The engine includes an engine main body where combustion is performed, an intake air passage and an exhaust passage connected to the engine main body, and a turbocharger. The turbocharger includes a compressor provided in the intake air passage and a turbine provided in the exhaust passage. The compressor and the turbine are rotated together.

In step A, the controller determines whether or not a prescribed execution condition is satisfied at the time of transition from an HV traveling mode (that is, a traveling mode in which the hybrid vehicle is driven by the engine and the motor with generation of traveling driving force by the engine) to an EV traveling mode (that is, a traveling mode in which the hybrid vehicle is driven by the motor without generation of traveling driving force by the engine).

In step B, when the controller determines in step A that the execution condition has been satisfied, the controller performs a self-sustaining operation or motoring of the engine.

In step C, when a prescribed quitting condition is satisfied during the self-sustaining operation or motoring of the engine, the controller stops the engine.

According to the method, the turbocharger can be cooled by intake air owing to the self-sustaining operation or motoring performed before the engine is stopped. Overheating of the turbocharger can thus be suppressed.

The quitting condition may be satisfied when a prescribed time period has elapsed since a time point of start of the self-sustaining operation or motoring or when a temperature of the turbocharger is equal to or lower than a prescribed temperature.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
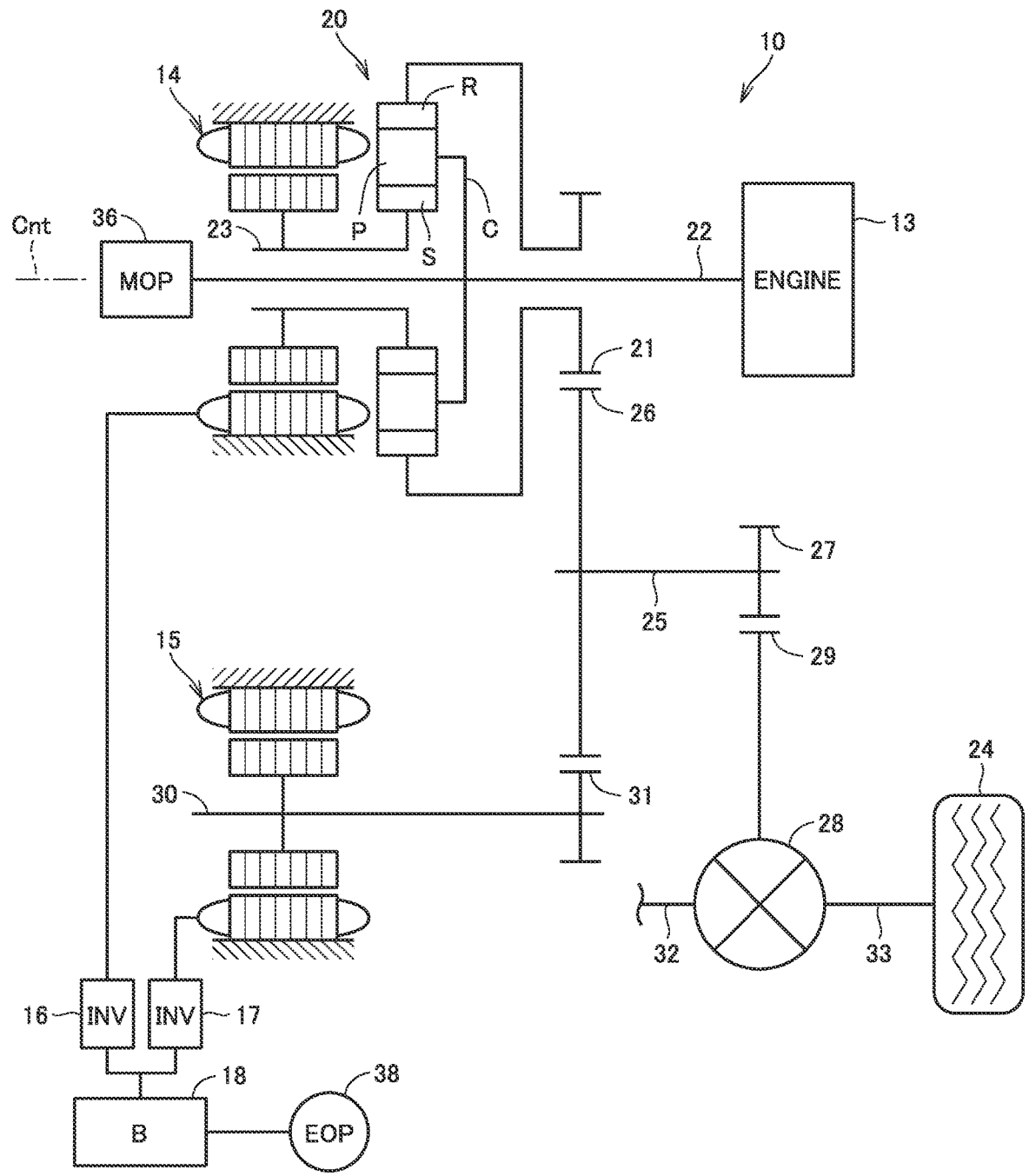
FIG. 1 is a diagram showing a drive device of a hybrid vehicle according to an embodiment of the present disclosure.

An embodiment of the present disclosure will be described in detail below with reference to the drawings. The same or corresponding elements in the drawings have the same reference characters allotted and description thereof will not be repeated. An electronic control unit is also referred to as an "ECU" below. A hybrid vehicle is also referred to as an "HV" and an electric vehicle is also referred to as an "EV".

FIG. 1 is a diagram showing a drive device of a hybrid vehicle according to this embodiment. Referring to FIG. 1, a drive device 10 of the hybrid vehicle (which is also simply referred to as a "vehicle" below) includes an engine 13 and motor generators (MGs) 14 and 15 as sources of motive power for traveling. Each of MGs 14 and 15 is a motor generator that performs both of a function as a motor that outputs torque by being supplied with driving electric power and a function as a generator that generates electric power by being supplied with torque. An alternating current (AC) motor (for example, a permanent magnet synchronous motor or an induction motor) is employed for each of MGs 14 and 15. MG 14 is electrically connected to a battery 18 with a first electric circuit being interposed. The first electric circuit includes a first inverter 16. MG 15 is electrically connected to battery 18 with a second electric circuit being interposed. The second electric circuit includes a second inverter 17. MG 14 and MG 15 according to the embodiment correspond to an exemplary "first motor generator" and an exemplary "second motor generator (motor)" according to the present disclosure, respectively.

Battery 18 includes, for example, a secondary battery. For example, a lithium ion battery can be adopted as the secondary battery. Battery 18 may include a battery assembly constituted of a plurality of electrically connected secondary batteries (for example, lithium ion batteries). The secondary battery constituting battery 18 is not limited to the lithium ion battery but another secondary battery (for example, a nickel metal hydride battery) may be applicable. A liquid electrolyte secondary battery or an all-solid-state secondary battery may be adopted as battery 18. Battery 18 according to the embodiment corresponds to an exemplary "power storage" according to the present disclosure. A large capacity capacitor can also be adopted as the power storage.

Drive device 10 includes a planetary gear mechanism 20. Engine 13 and MG 14 are coupled to planetary gear mechanism 20. Planetary gear mechanism 20 is a single-pinion planetary gear and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Engine 13 has output shaft 22 coupled to carrier C. MG 14 has a rotor shaft 23 coupled to sun gear S. Ring gear R is coupled to output gear 21.

In planetary gear mechanism 20, carrier C serves as an input element, ring gear R serves as an output element, and sun gear S serves as a reaction force element. Torque output from engine 13 is input to carrier C. Planetary gear mechanism 20 transmits torque output from engine 13 to output shaft 22 by splitting torque into torque to sun gear S (and to MG 14) and torque to ring gear R (and to output gear 21). Ring gear R outputs torque to output gear 21 and reaction torque is applied to sun gear S by MG 14. Torque output from planetary gear mechanism 20 (planetary gear) to output gear 21 is transmitted to a drive wheel 24 through a driven gear 26, a countershaft 25, a drive gear 27, a differential gear 28, and driveshafts 32 and 33 which will be described below.

Drive device 10 further includes countershaft 25, driven gear 26, drive gear 27, differential gear 28, a drive gear 31, and driveshafts 32 and 33. Differential gear 28 corresponds to a final reduction gear and includes a ring gear 29. Output gear 21 coupled to ring gear R of planetary gear mechanism 20 is meshed with driven gear 26. Drive gear 31 attached to a rotor shaft 30 of MG 15 is also meshed with driven gear 26. Countershaft 25 is attached to driven gear 26 and arranged in parallel to axis Cnt. Drive gear 27 is attached to countershaft 25 and meshed with ring gear 29 of differential gear 28.

Driven gear 26 functions to combine torque output to rotor shaft 30 by MG 15 and torque output from ring gear R to output gear 21. Drive torque thus combined is transmitted to drive wheel 24 through driveshafts 32 and 33 extending laterally from differential gear 28.

Drive device 10 further includes a mechanical oil pump 36 and an electric oil pump 38. Oil pump 36 is provided coaxially with output shaft 22. Oil pump 36 is driven by engine 13. Oil pump 36 delivers lubricating oil to planetary gear mechanism 20, MG 14, MG 15, and differential gear 28 while engine 13 is on. Electric oil pump 38 is driven by electric power supplied by battery 18 or a not-shown another vehicle-mounted battery (for example, an auxiliary battery) and controlled by an HVECU 62 (see FIG. 3) which will be described later. Electric oil pump 38 delivers lubricating oil to planetary gear mechanism 20, MG 14, MG 15, and differential gear 28 while engine 13 is off. Lubricating oil delivered by each of oil pump 36 and electric oil pump 38 has a cooling function.

Figure 2:
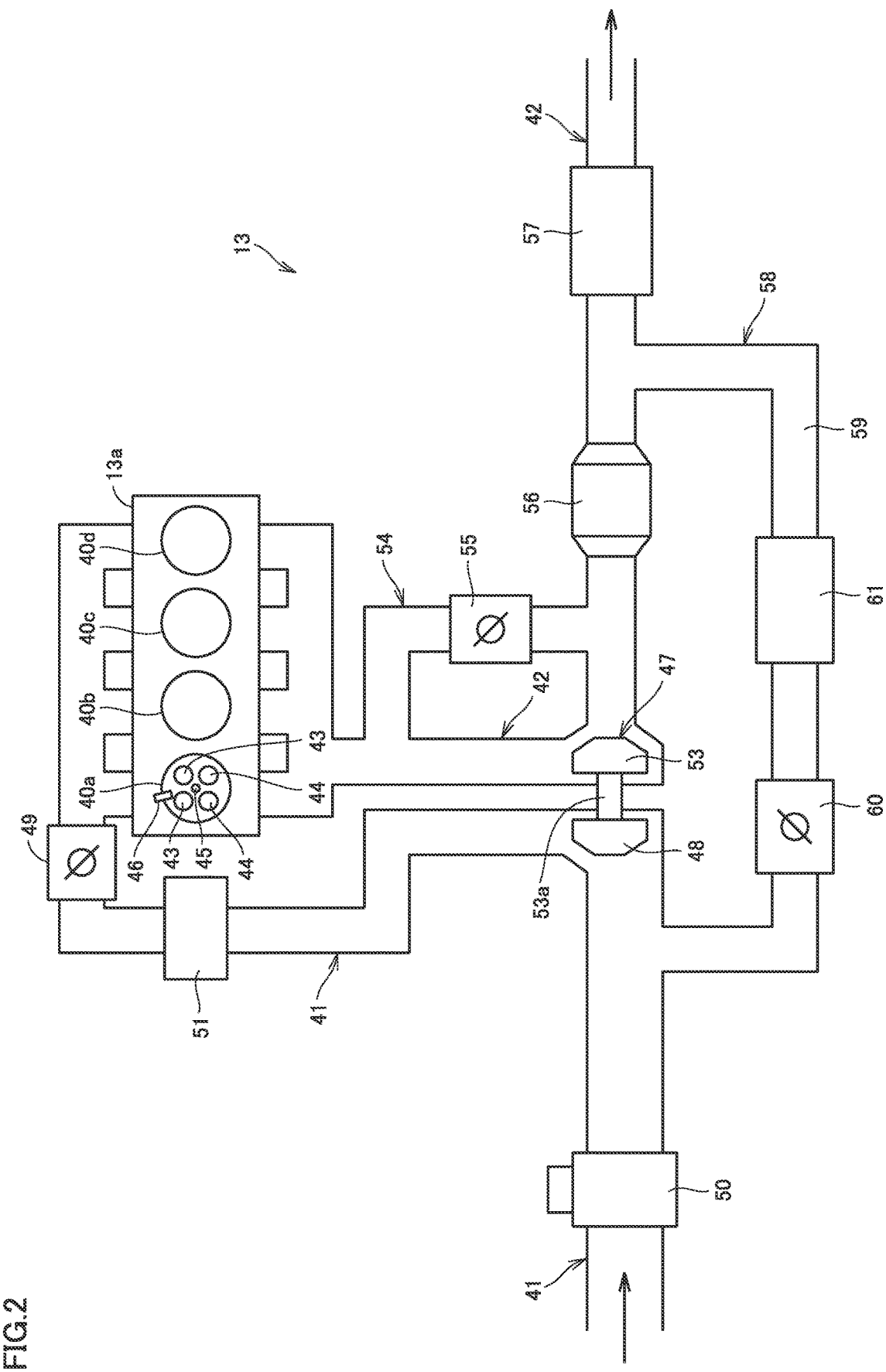
FIG. 2 is a diagram showing an engine of the hybrid vehicle according to the embodiment of the present disclosure.

FIG. 2 is a diagram showing a configuration of engine 13. Referring to FIG. 2, engine 13 is, for example, an in-line four-cylinder spark ignition internal combustion engine. Engine 13 includes an engine main body 13a including four cylinders 40a, 40b, 40c, and 40d. In engine main body 13a, four cylinders 40a, 40b, 40c, and 40d are aligned in one direction. Each of cylinders 40a, 40b, 40c, and 40d will be denoted as a "cylinder 40" below unless they are explained as being distinguished from one another.

An intake air passage 41 and an exhaust passage 42 are connected to each cylinder 40 of engine main body 13a. Intake air passage 41 is opened and closed by two intake valves 43 provided in each cylinder 40, and exhaust passage 42 is opened and closed by two exhaust valves 44 provided in each cylinder 40. An air fuel mixture of air and fuel (for example, gasoline) is generated by adding fuel to air supplied to engine main body 13a through intake air passage 41. Fuel is injected into cylinder 40 by an injector 46 provided, for example, for each cylinder 40 and the air fuel mixture is generated in cylinder 40. An ignition plug 45 provided for each cylinder 40 ignites the air fuel mixture in cylinder 40. Combustion is thus performed in each cylinder 40. Combustion energy generated at the time of combustion of the air fuel mixture in each cylinder 40 is converted to kinetic energy by a piston (not shown) in each cylinder 40 and output to output shaft 22 (FIG. 1). A fuel supply scheme is not limited to direct injection, and may be port injection or both of direct injection and port injection.

Engine 13 includes a turbocharger 47 that uses exhaust energy to boost suctioned air. Turbocharger 47 includes a compressor 48, a turbine 53, and a shaft 53a. Compressor 48 and turbine 53 are coupled to each other with shaft 53a being interposed and rotated together. Rotational force of turbine 53 rotated by receiving a flow of exhaust emitted from engine main body 13a is transmitted to compressor 48 through shaft 53a. As compressor 48 is rotated, intake air toward engine main body 13a is compressed and compressed air is supplied to engine main body 13a. Turbocharger 47 boosts suctioned air (that is, increases a density of air suctioned into engine main body 13a) by rotating turbine 53 and compressor 48 by using exhaust energy.

Compressor 48 is arranged in intake air passage 41. An air flow meter 50 is provided at a position upstream from compressor 48 in intake air passage 41. Air flow meter 50 outputs a signal in accordance with a flow rate of air that flows through intake air passage 41. An intercooler 51 is provided at a position downstream from compressor 48 in intake air passage 41. Intercooler 51 cools intake air compressed by compressor 48. A throttle valve (intake throttle valve) 49 is provided at a position downstream from intercooler 51 in intake air passage 41. Throttle valve 49 can regulate a flow rate of intake air that flows through intake air passage 41. Air that flows into intake air passage 41 is supplied to each cylinder 40 of engine main body 13a sequentially through air flow meter 50, compressor 48, intercooler 51, and throttle valve 49 in this order.

Turbine 53 is arranged in exhaust passage 42. A waste gate valve mechanism 54 is provided in exhaust passage 42. Waste gate valve mechanism 54 can bypass exhaust upstream from turbine 53 to a portion downstream from turbine 53. Waste gate valve mechanism 54 includes a waste gate valve 55 that can regulate a flow rate of exhaust guided to turbine 53. A flow rate (and a boost pressure) of exhaust that flows into turbine 53 is varied by a position of waste gate valve 55. As waste gate valve 55 is closed (that is, closer to a fully closed state), a flow rate of exhaust that flows into turbine 53 increases and a pressure of suctioned air (that is, a boost pressure) is higher. Exhaust emitted from engine main body 13a passes through any of turbine 53 and waste gate valve 55 and emitted into the atmosphere after a harmful substance is removed therefrom by a start catalyst converter 56 and an aftertreatment apparatus 57. Aftertreatment apparatus 57 contains, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41 by connecting a portion of exhaust passage 42 between start catalyst converter 56 and aftertreatment apparatus 57 and a portion of intake air passage 41 between compressor 48 and air flow meter 50 to each other. EGR valve 60 and EGR cooler 61 are provided in EGR passage 59. EGR valve 60 can regulate a flow rate of EGR gas that flows through EGR passage 59. EGR cooler 61 cools EGR gas that flows through EGR passage 59.

Figure 3:
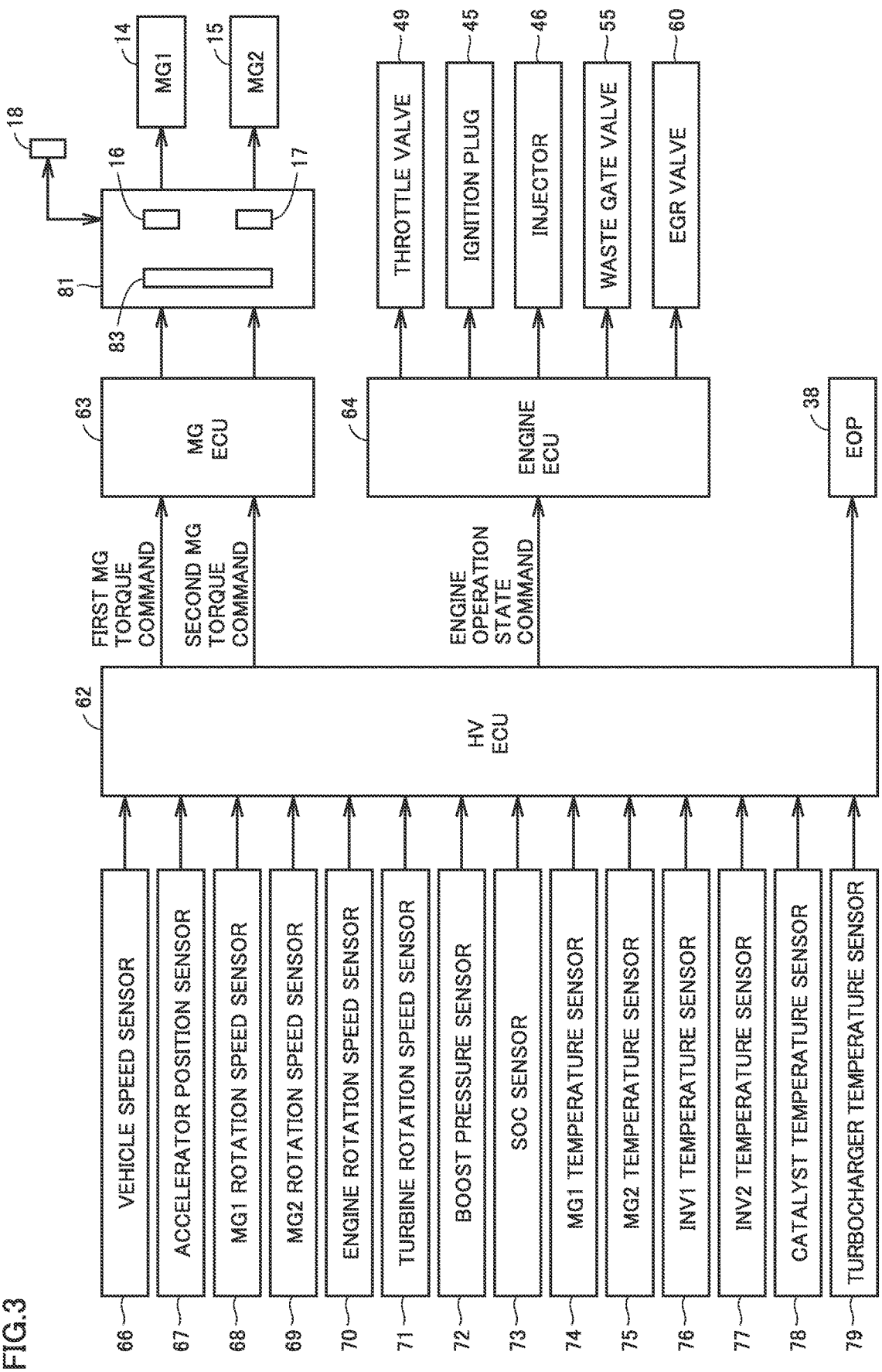
FIG. 3 is a diagram showing a control system of the hybrid vehicle according to the embodiment of the present disclosure.

FIG. 3 is a diagram showing a control system of the hybrid vehicle according to the embodiment. Referring to FIG. 3 together with FIGS. 1 and 2, the control system of the vehicle includes HVECU 62, an MGECU 63, and an engine ECU 64. A vehicle speed sensor 66, an accelerator position sensor 67, an MG1 rotation speed sensor 68, an MG2 rotation speed sensor 69, an engine rotation speed sensor 70, a turbine rotation speed sensor 71, a boost pressure sensor 72, an SOC sensor 73, an MG1 temperature sensor 74, an MG2 temperature sensor 75, an INV1 temperature sensor 76, an INV2 temperature sensor 77, a catalyst temperature sensor 78, and a turbocharger temperature sensor 79 are connected to HVECU 62.

Vehicle speed sensor 66 outputs a signal in accordance with a speed of the vehicle (that is, a traveling speed of the vehicle) to HVECU 62. Accelerator position sensor 67 outputs a signal in accordance with an accelerator position (for example, an amount of pressing of an accelerator pedal)

to HVECU 62. The accelerator position is a parameter that represents an amount of acceleration requested of the vehicle by a driver (which is also referred to as a "requested acceleration amount" below). As a degree of pressing of the accelerator is higher, the requested acceleration amount is larger.

MG1 rotation speed sensor 68 outputs a signal in accordance with a rotation speed of MG 14 to HVECU 62. MG2 rotation speed sensor 69 outputs a signal in accordance with a rotation speed of MG 15 to HVECU 62. Engine rotation speed sensor 70 outputs a signal in accordance with a rotation speed of output shaft 22 of engine 13 to HVECU 62. Turbine rotation speed sensor 71 outputs a signal in accordance with a rotation speed of turbine 53 of turbocharger 47 to HVECU 62. Boost pressure sensor 72 outputs a signal in accordance with a boost pressure of engine 13 to HVECU 62.

SOC sensor 73 outputs a signal in accordance with a state of charge (SOC) representing a ratio of a remaining charge amount to a full charge amount (that is, a power storage capacity) of battery 18 to HVECU 62. MG1 temperature sensor 74 outputs a signal in accordance with a temperature of MG 14 to HVECU 62. MG2 temperature sensor 75 outputs a signal in accordance with a temperature of MG 15 to HVECU 62. INV1 temperature sensor 76 outputs a signal in accordance with a temperature of first inverter 16 to HVECU 62. INV2 temperature sensor 77 outputs a signal in accordance with a temperature of second inverter 17 to HVECU 62. Catalyst temperature sensor 78 outputs a signal in accordance with a temperature of aftertreatment apparatus 57 to HVECU 62. Turbocharger temperature sensor 79 outputs a signal in accordance with a temperature of turbocharger 47 (for example, a temperature of turbine 53) to HVECU 62.

In the embodiment, turbocharger temperature sensor 79 is provided in turbine 53 and outputs a signal in accordance with a temperature of turbine 53 to HVECU 62. Without being limited as such, a portion where a temperature of turbocharger 47 is to be measured can be varied as appropriate, and turbocharger temperature sensor 79 may be provided, for example, in shaft 53a. A temperature of turbocharger 47 may be measured at a plurality of locations.

Figure 4:
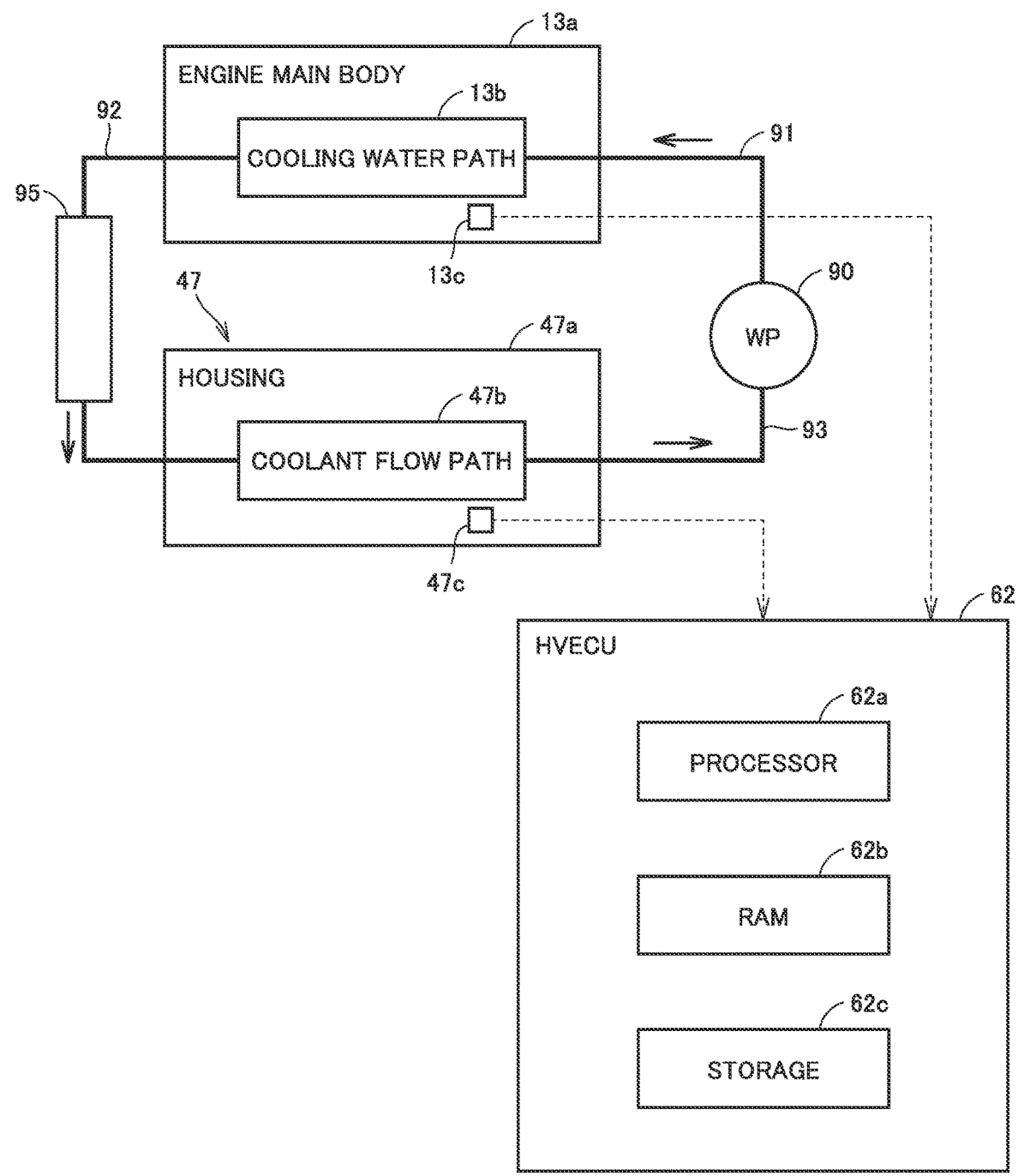
FIG. 4 is a diagram showing an engine main body and a cooling apparatus for a turbocharger in the hybrid vehicle according to the present disclosure.

FIG. 4 is a diagram showing engine main body 13a and a cooling apparatus for turbocharger 47 in the hybrid vehicle according to the embodiment. Referring to FIG. 4 together with FIG. 2, the vehicle further includes a water pump 90. Water pump 90 is a mechanical pump driven by engine 13. Water pump 90 is operated by motive power output to output shaft 22 (FIG. 1) of engine 13. While engine 13 is on, water pump 90 is also on, and when engine 13 is stopped, water pump 90 is also stopped.

Engine main body 13a includes a cooling water path 13b through which cooling water that cools engine main body 13a flows. A water jacket formed in a cylinder block (not shown) of engine main body 13a serves as cooling water path 13b. Cooling water path 13b is formed in engine main body 13a such that engine main body 13a is cooled by a flow of cooling water. The vehicle further includes a temperature sensor 13c that outputs to HVECU 62, a signal in accordance with a temperature of cooling water (which is also referred to as an "engine cooling water temperature" below) that flows through cooling water path 13b.

Turbocharger 47 includes a housing 47a having a coolant flow path 47b through which coolant (in the embodiment, cooling water) for cooling turbocharger 47 flows. Coolant flow path 47b is formed in housing 47a such that turbocharger 47 is cooled by a flow of coolant (in the embodiment, cooling water). Coolant flow path 47b may be in such a form that a particularly readily heated portion of turbocharger 47 (for example, a bearing of shaft 53a) is intensively cooled. The vehicle further includes a temperature sensor 47c that outputs to HVECU 62, a signal in accordance with a temperature of coolant (which is also referred to as a "turbocharger coolant temperature" below) that flows through coolant flow path 47b.

Water pump 90 has a discharge port connected to cooling water path 13b through a water path 91. Cooling water path 13b is connected to coolant flow path 47b through a water path 92. Coolant flow path 47b is connected to a suction port of water pump 90 through a water path 93. Cooling water path 13b and coolant flow path 47b are connected to each other through water path 92 provided with a heat exchanger 95 (for example, a radiator) that removes heat from cooling water that flows therethrough. Water pump 90 circulates cooling water through water path 91, cooling water path 13b, water path 92, heat exchanger 95, coolant flow path 47b, and water path 93. Though cooling water path 13b is located upstream from coolant flow path 47b in the embodiment, cooling water path 13b may be located downstream from coolant flow path 47b.

HVECU 62 includes a processor 62a, a random access memory (RAM) 62b, and a storage 62c as well as input and output ports and a timer that are not shown. For example, a central processing unit (CPU) can be adopted as processor 62a. RAM 62b functions as a work memory that temporarily stores data to be processed by processor 62a. Storage 62c is capable of saving information that has been put therein. Storage 62c includes, for example, a read only memory (ROM) and a rewritable non-volatile memory. As processor 62a executes a program stored in storage 62c, various types of control of the vehicle are carried out. Other ECUs (for example, MGECU 63 and engine ECU 64) are also the same in hardware configuration as HVECU 62. Though HVECU 62, MGECU 63, and engine ECU 64 are separately provided in the embodiment, a single ECU may perform functions thereof.

Referring to FIGS. 1 to 3, the vehicle can travel in an HV traveling mode and an EV traveling mode. Traveling in the HV traveling mode is referred to as "HV traveling" below and traveling in the EV traveling mode is referred to as "EV traveling" below. HV traveling is performed by engine 13 and MG 15 with generation of traveling driving force by engine 13. EV traveling is performed by MG 15 without generation of traveling driving force by engine 13. HVECU 62 selects a suitable traveling mode depending on a situation and the vehicle travels in the selected traveling mode. HVECU 62 calculates requested driving force, for example, based on an accelerator position and a vehicle speed, and controls engine 13, MG 14, and MG 15 in coordination such that requested driving force is output to drive wheel 24. In HV traveling, torque obtained by combining torque output by engine 13 and torque output by MG 15 serves as traveling driving force. In EV traveling, torque output by MG 15 serves as traveling driving force. Torque to be generated by MG 15 is calculated such that requested driving force is output to drive wheel 24.

HVECU 62 controls an operating point of engine 13 to a target operating point. The operating point of engine 13 refers to a state of operation of engine 13 defined by engine torque and an engine rotation speed. HVECU 62 calculates requested engine power based on the traveling mode and requested driving force and determines a target operating point based on requested engine power. HVECU 62 sets as the target operating point, for example, an intersection between a line (an equal power line) at which engine power is equal to requested engine power and an optimal fuel efficiency line on a coordinate plane of the engine rotation speed and engine torque. A line that connects operating points of the engine at which fuel efficiency is highest on the coordinate plane of the engine rotation speed and engine torque to one another is defined as the optimal fuel efficiency line.

HVECU 62 can adjust a rotation speed of engine 13 by controlling a rotation speed of MG 14. HVECU 62 can arbitrarily control a rotation speed of MG 14 in accordance with magnitude of a current fed to MG 14 and a frequency thereof. Torque to be generated by MG 14 is calculated such that the operating point of engine 13 is set to the target operating point.

HVECU 62 outputs to engine ECU 64 (FIG. 3), a command for controlling engine 13. Engine ECU 64 controls throttle valve 49, ignition plug 45, injector 46, waste gate valve 55, and EGR valve 60 in accordance with a command from HVECU 62. HVECU 62 can control the engine by means of engine ECU 64. For example, when engine torque exceeds a prescribed value, HVECU 62 requests of engine ECU 64 to increase a boost pressure. Engine ECU 64 increases a boost pressure by closing waste gate valve 55 in accordance with a request from HVECU 62.

HVECU 62 outputs a command for controlling each of MG 14 and MG 15 to MGECU 63 (FIG. 3). MGECU 63 controls MG 14 and MG 15 by means of a PCU 81. MGECU 63 generates a current signal (for example, a signal representing magnitude and a frequency of a current) corresponding to target torque of each of MG 14 and MG 15 in accordance with a command from HVECU 62 and outputs a generated current signal to PCU 81. HVECU 62 can control the motor by means of MGECU 63.

PCU 81 shown in FIG. 3 includes first inverter 16, second inverter 17, and a converter 83. First inverter 16 and converter 83 convert electric power between battery 18 and MG 14. Second inverter 17 and converter 83 convert electric power between battery 18 and MG 15. PCU 81 has electric power stored in battery 18 supplied to each of MG 14 and MG 15, and has electric power generated by each of MG 14 and MG 15 supplied to battery 18. PCU 81 can control states of MGs 14 and 15 separately, and, for example, it can set MG 14 to a regeneration state (that is, a power generation state) while it can set MG 15 to a power running state.

Figure 5:
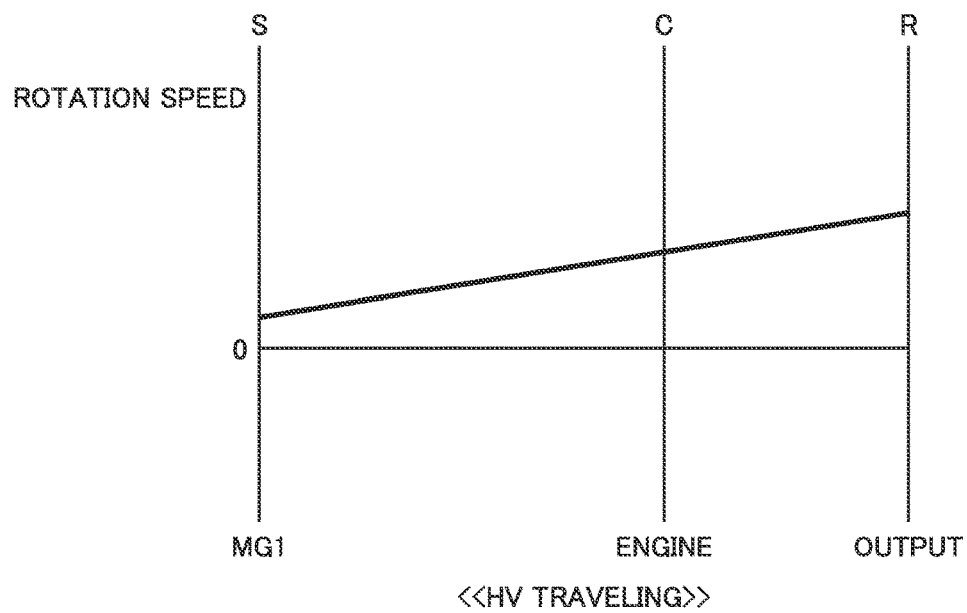
FIG. 5 is a nomographic chart showing exemplary relation among rotation speeds of rotary elements (a sun gear, a carrier, and a ring gear) of a planetary gear during HV traveling, in the hybrid vehicle according to the embodiment of the present disclosure.

FIG. 5 is a nomographic chart showing exemplary relation among rotation speeds of sun gear S, carrier C, and ring gear R of planetary gear mechanism 20 during HV traveling. Referring to FIG. 5, in exemplary HV traveling, in transmission of torque output from engine 13 (that is, torque input to carrier C) to drive wheel 24, MG 14 applies reaction force to sun gear S of planetary gear mechanism 20. Therefore, sun gear S functions as a reaction force element. In HV traveling, in order to apply torque in accordance with target engine torque based on an acceleration request to drive wheel 24, MG 14 is caused to output reaction torque against target engine torque. MG 14 can perform regenerative electricity generation by using this reaction torque.

Figure 6:
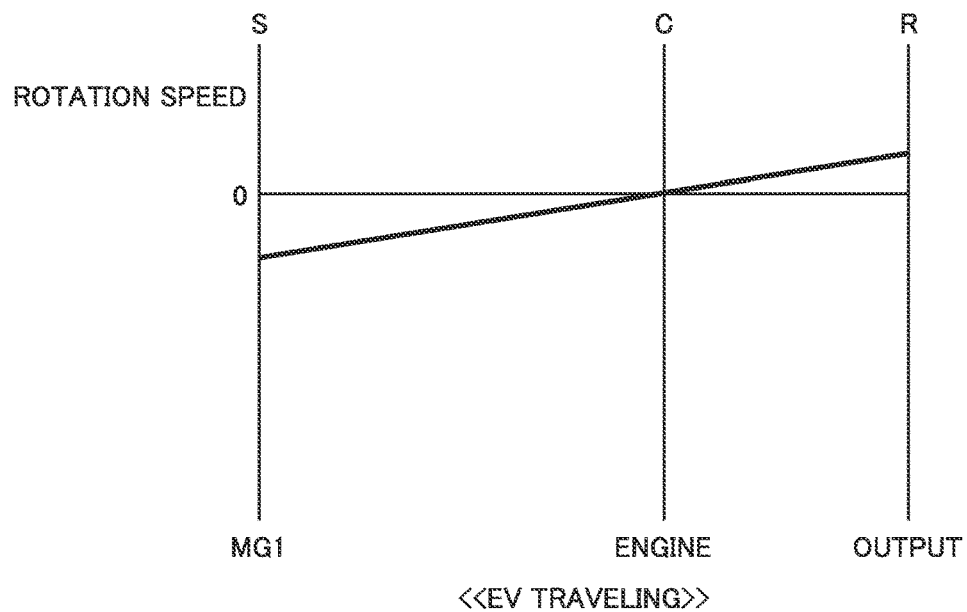
FIG. 6 is a nomographic chart showing exemplary relation among rotation speeds of the rotary elements (the sun gear, the carrier, and the ring gear) of the planetary gear during EV traveling, in the hybrid vehicle according to the embodiment of the present disclosure.

FIG. 6 is a nomographic chart showing exemplary relation among rotation speeds of sun gear S, carrier C, and ring gear R of planetary gear mechanism 20 during EV traveling. Referring to FIG. 6, in EV traveling, MG 15 generates traveling driving force without generation of traveling driving force by engine 13. In EV traveling, HVECU 62 controls ignition plug 45 and injector 46 so as not to allow combustion in engine 13. Since normal EV traveling is carried out without rotation of engine 13, the rotation speed of carrier C is 0 as shown in FIG. 6. In the embodiment, however, motoring of engine 13 is performed during the intake air cooling period which will be described later and hence EV traveling may be performed with engine 13 being rotated (see FIG. 9).

Figure 7:
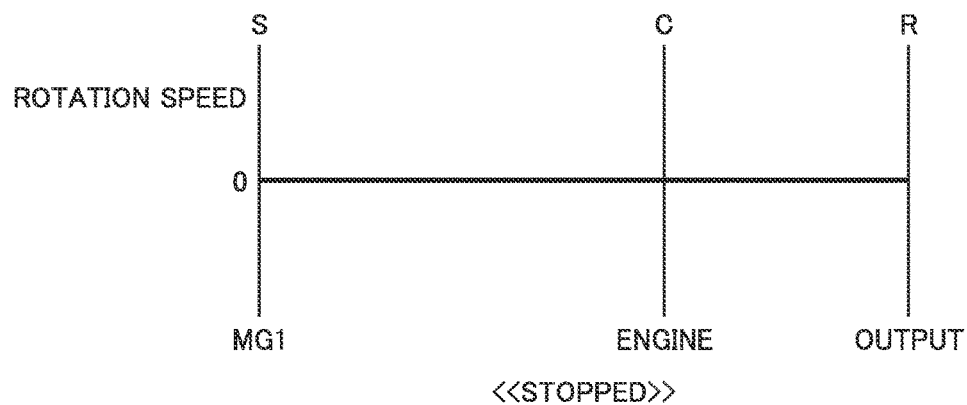
FIG. 7 is a nomographic chart showing exemplary relation among rotation speeds of the rotary elements (the sun gear, the carrier, and the ring gear) of the planetary gear while the vehicle is parked, in the hybrid vehicle according to the embodiment of the present disclosure.

FIG. 7 is a nomographic chart showing exemplary relation among rotation speeds of sun gear S, carrier C, and ring gear R of planetary gear mechanism 20 while the vehicle is parked. Referring to FIG. 7, HVECU 62 controls engine 13 and MGs 14 and 15 to set the rotation speed of each of sun gear S, carrier C, and ring gear R to 0, so that traveling of the vehicle is stopped and the vehicle is in a stopped state.

In a general hybrid vehicle, opportunities for cooling the turbocharger are fewer and hence the turbocharger tends to be high in temperature. In the hybrid vehicle according to the embodiment, HVECU 62 is configured as described below in order to provide an opportunity to cool turbocharger 47 in transition from HV traveling to EV traveling.

When a prescribed execution condition is satisfied at the time of transition of a traveling state of the vehicle from HV traveling to EV traveling (which is also referred to as "at the time of EV transition" below), HVECU 62 performs motoring of engine 13 for the intake air cooling period and thereafter stops engine 13. HVECU 62 according to the embodiment corresponds to an exemplary "controller" according to the present disclosure.

Figure 8:
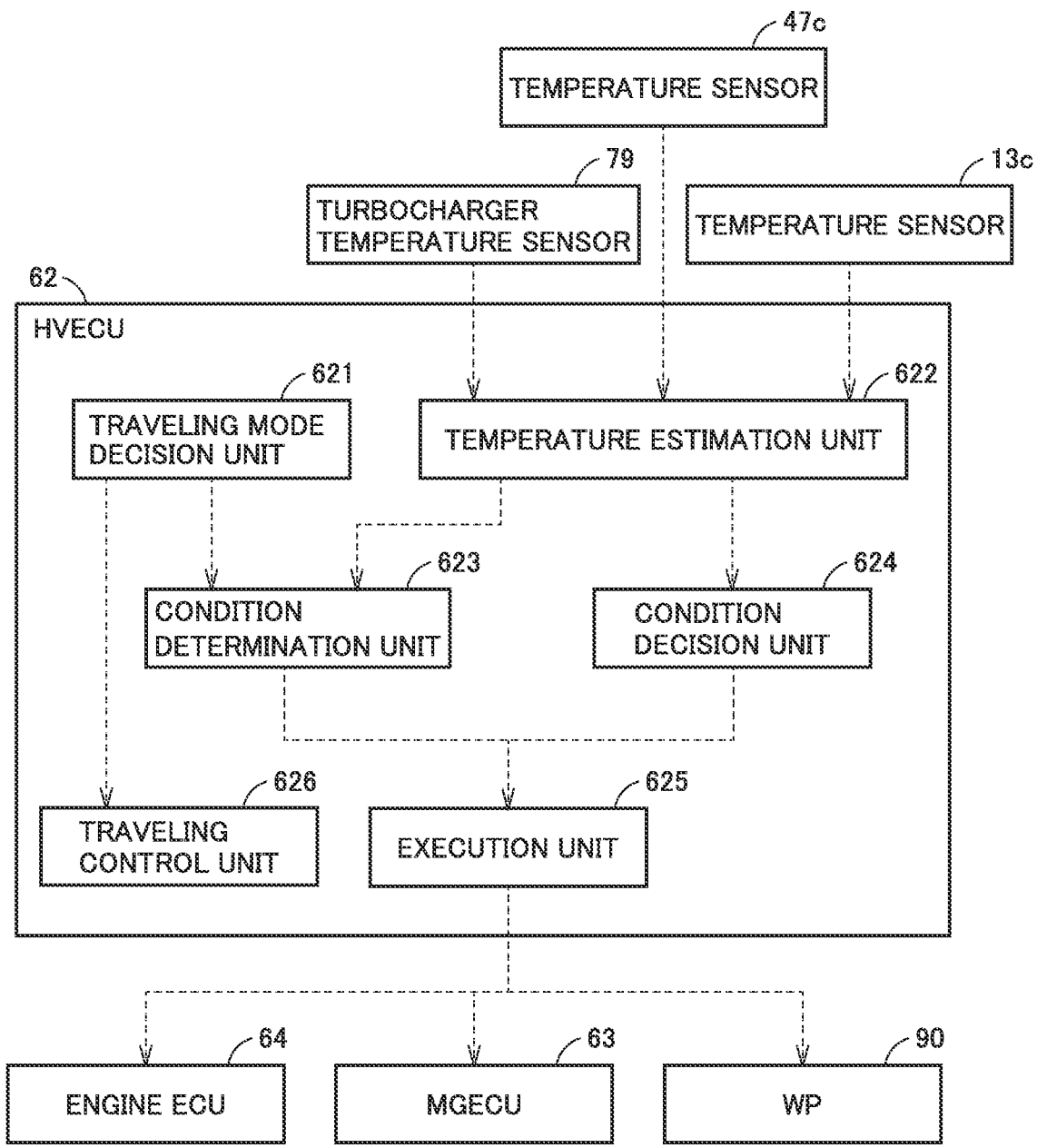
FIG. 8 is a functional block diagram showing, for each function, components of a controller of the hybrid vehicle according to the embodiment of the present disclosure.

FIG. 8 is a functional block diagram showing components of HVECU 62 for each function. Referring to FIG. 8, HVECU 62 includes a traveling mode decision unit 621, a temperature estimation unit 622, a condition determination unit 623, a condition decision unit 624, an execution unit 625, and a traveling control unit 626. Each unit above of HVECU 62 is implemented, for example, by processor 62a and a program executed by processor 62a. Without being limited as such, each unit may be implemented by dedicated hardware (electronic circuit).

Traveling mode decision unit 621 determines a traveling mode of the vehicle. Traveling mode decision unit 621 determines an appropriate traveling mode depending on a situation. For example, traveling mode decision unit 621 selects the EV traveling mode under a low-speed and low-load traveling condition and selects the HV traveling mode under a high-speed and high-load traveling condition. Traveling load is determined as being higher as requested driving force is greater. Traveling mode decision unit 621 notifies each of condition determination unit 623 and traveling control unit 626 of the determined traveling mode (for example, the traveling mode selected from the EV traveling mode and the HV traveling mode). Each time the traveling mode is changed, traveling mode decision unit 621 notifies each of condition determination unit 623 and traveling control unit 626 of the traveling mode after change.

Traveling control unit 626 controls traveling in correspondence with the traveling mode determined by traveling mode decision unit 621. Traveling control unit 626 controls engine 13, MG 14, and MG 15 in coordination such that requested driving force is output to drive wheel 24 shown in FIG. 1.

Temperature estimation unit 622 estimates a temperature of turbocharger 47. In the embodiment, temperature estimation unit 622 determines whether the temperature of turbocharger 47 is high or low and outputs a result of determination to condition determination unit 623. Temperature estimation unit 622 obtains a detection value (that is, a temperature of turbocharger 47 detected by turbocharger temperature sensor 79) from turbocharger temperature sensor 79, and outputs the detection value to condition decision unit 624.

When the detection value from turbocharger temperature sensor 79 is equal to or higher than a prescribed temperature, temperature estimation unit 622 outputs a signal indicating that a temperature of turbocharger 47 is high (which is also referred to as a "high-temperature signal" below) to condition determination unit 623, and when the detection value from turbocharger temperature sensor 79 is lower than the prescribed temperature, it outputs a signal indicating that the temperature of turbocharger 47 is low (which is also referred to as a "low-temperature signal" below) to condition determination unit 623.

Temperature estimation unit 622 periodically (for example, in real time) outputs the result of determination (that is, any of the low-temperature signal and the high-temperature signal) and the detection value from turbocharger temperature sensor 79. Without being limited as such, temperature estimation unit 622 may provide an output in response to a request from condition determination unit 623 and condition decision unit 624.

An approach to determination as to whether the temperature of turbocharger 47 is high or low is not limited to the above. Temperature estimation unit 622 may determine whether the temperature of turbocharger 47 is high or low based on whether or not a turbocharger coolant temperature detected by temperature sensor 47c is equal to or higher than a prescribed temperature. The temperature of turbocharger 47 used for the determination above may be a temperature of turbocharger 47 estimated from records of operations of engine 13 (for example, a state of operations of engine 13 in immediately preceding HV traveling). Temperature estimation unit 622 may estimate the temperature of turbocharger 47 in consideration of a rotation speed of turbine 53 in addition to the records of operations of engine 13. Turbocharger temperature sensor 79 may detect a temperature of turbocharger 47 at a plurality of locations, and an average value of the temperatures at the plurality of locations may be used for making determination above. The temperature of turbocharger 47 output from temperature estimation unit 622 to condition decision unit 624 is not limited to the detection value from turbocharger temperature sensor 79 either, and any of the turbocharger coolant temperature, the estimated temperature, and the average value described above may be applicable.

A threshold value (that is, the prescribed temperature) for determining whether the temperature of turbocharger 47 is high or low may be fixed or variable. For example, as an engine cooling water temperature detected by temperature sensor 13c is higher, the threshold value may be smaller. As the engine cooling water temperature is higher, the temperature of exhaust tends to be higher. As the temperature of exhaust is higher, turbine 53 is less likely to radiate heat.

Condition determination unit 623 determines whether or not a prescribed execution condition is satisfied. In the embodiment, the execution condition includes only a temperature requirement. Specifically, the execution condition is satisfied when the temperature requirement for turbocharger 47 is satisfied at the time of EV transition. The temperature requirement is that the temperature of turbocharger 47 is equal to or higher than a prescribed temperature. Condition determination unit 623 determines whether or not the execution condition is satisfied when it receives from traveling mode decision unit 621, a notification that the traveling mode has made transition from the HV traveling mode to the EV traveling mode, and outputs a result of determination to execution unit 625. Condition determination unit 623 determines whether or not the temperature requirement is satisfied based on a signal received from temperature estimation unit 622. Condition determination unit 623 determines that the temperature requirement is satisfied (and the execution condition is satisfied) when the signal from temperature estimation unit 622 is the high-temperature signal, and determines that the temperature requirement is not satisfied (and the execution condition is not satisfied) when the signal from temperature estimation unit 622 is the low-temperature signal.

The execution condition may include another requirement instead of or in addition to the temperature requirement. The execution condition may include a condition that an SOC of battery 18 is equal to or greater than a prescribed value. The execution condition may include a condition that a travel distance in immediately preceding HV traveling is equal to or longer than a prescribed value. A time period of traveling may be adopted instead of a travel distance. The execution condition may always be satisfied. The execution condition may be modifiable. A user may be permitted to modify the execution condition.

Condition decision unit 624 determines a motoring condition. The motoring condition refers to a condition concerning motoring of engine 13 executed by execution unit 625 which will be described later, and includes, for example, a motoring quitting condition and an engine rotation speed in motoring. In the embodiment, execution unit 625 performs motoring under a condition determined by condition decision unit 624 (for example, the engine rotation speed in motoring). When a prescribed time period (which is also referred to as a "cooling time period" below) has elapsed since a time point of start of motoring, the motoring quitting condition is satisfied. When the motoring quitting condition is satisfied, motoring (and the intake air cooling period) ends. Condition decision unit 624 determines a cooling time period and the engine rotation speed in motoring. Condition decision unit 624 extends the cooling time period as the temperature of turbocharger 47 obtained from temperature estimation unit 622 is higher. Condition decision unit 624 sets a higher engine rotation speed in motoring (that is, the engine rotation speed during the intake air cooling period) as the temperature of turbocharger 47 obtained from temperature estimation unit 622 is higher. Condition decision unit 624 outputs the determined motoring condition to execution unit 625.

The motoring quitting condition is not limited to the above and can arbitrarily be set. For example, the motoring quitting condition may be satisfied when the temperature of turbocharger 47 is equal to or lower than a prescribed temperature (which is also referred to as a "quitting temperature" below). At least one of the cooling time period and the engine rotation speed in motoring may be determined regardless of the temperature of turbocharger 47 and may be fixed.

When the execution condition is satisfied at the time of EV transition, execution unit 625 performs motoring of engine 13 for the intake air cooling period and thereafter stops engine 13. More specifically, when execution unit 625 receives a notification that the execution condition is satisfied from condition determination unit 623, execution unit 625 controls engine 13, MG 14, and MG 15 (FIG. 1) in coordination such that motoring of engine 13 is performed under the condition determined by condition decision unit 624. For example, execution unit 625 cuts off fuel to engine 13, performs EV traveling by means of MG 15, and adjusts the engine rotation speed by means of MG 14 (see FIG. 9 which will be described later). When the motoring quitting condition determined by condition decision unit 624 is satisfied, execution unit 625 quits motoring and stops engine 13. The period for which execution unit 625 performs motoring corresponds to the intake air cooling period. Since motoring of engine 13 is performed for the intake air cooling period, cooling water is circulated by water pump 90 (FIG. 4). When execution unit 625 receives a notification that the execution condition is not satisfied from condition determination unit 623, execution unit 625 immediately stops engine 13 without motoring being performed.

Figure 9:
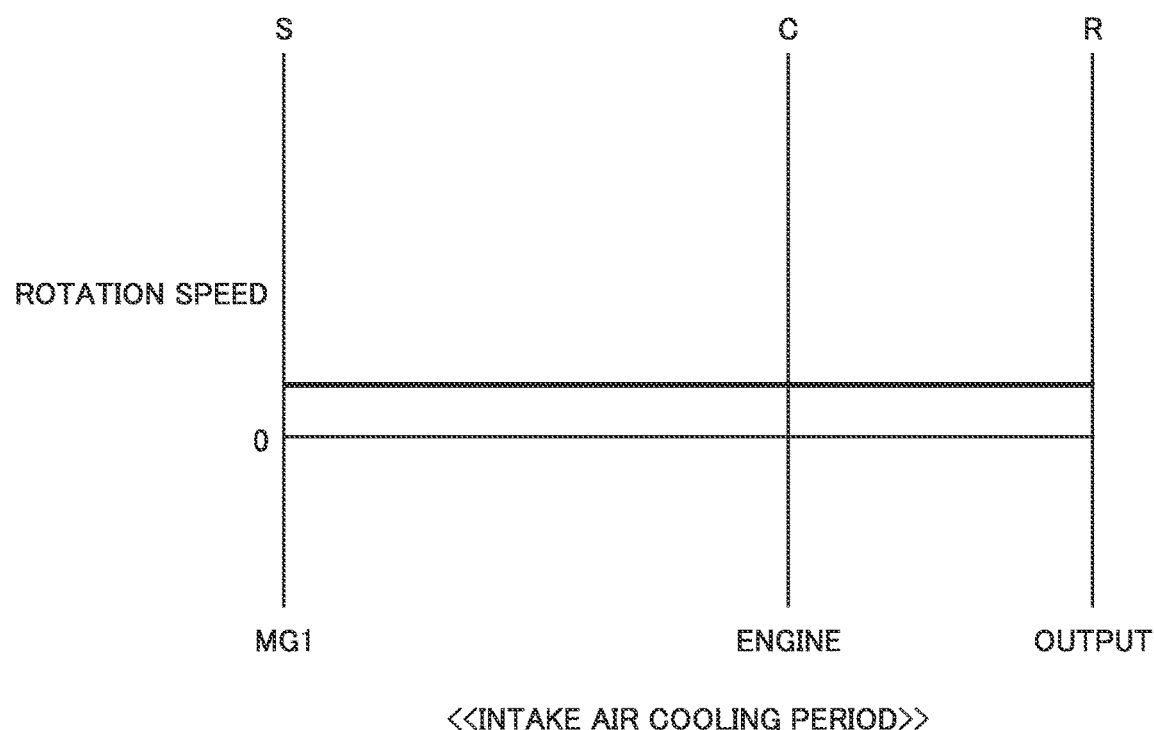
FIG. 9 is a nomographic chart showing exemplary relation among rotation speeds of the rotary elements (the sun gear, the carrier, and the ring gear) of the planetary gear during an intake air cooling period, in the hybrid vehicle according to the embodiment of the present disclosure.

FIG. 9 is a nomographic chart showing exemplary relation among rotation speeds of sun gear S, carrier C, and ring gear R of planetary gear mechanism 20 during the intake air cooling period. Referring to FIG. 9, when the traveling mode of the vehicle makes transition from the HV traveling mode to the EV traveling mode, HVECU 62 controls ignition plug 45 and injector 46 to cut off fuel and stop ignition, so that combustion in engine 13 is not performed. Therefore, during the intake air cooling period, engine 13 is in a non-combustion state and traveling driving force is not generated by engine 13. HVECU 62 controls MGs 14 and 15 to perform motoring of engine 13 in the non-combustion state. HVECU 62 can adjust the rotation speed of engine 13 by controlling torque of MG 14 while it controls MG 15 to generate traveling torque to perform EV traveling. In the example shown in FIG. 9, the rotation speed of MG 14 (and the rotation speed of sun gear S) is substantially equal to the rotation speed of ring gear R, however, the rotation speed of MG 14 during the intake air cooling period may be higher or lower than the rotation speed of ring gear R.

Figure 10:
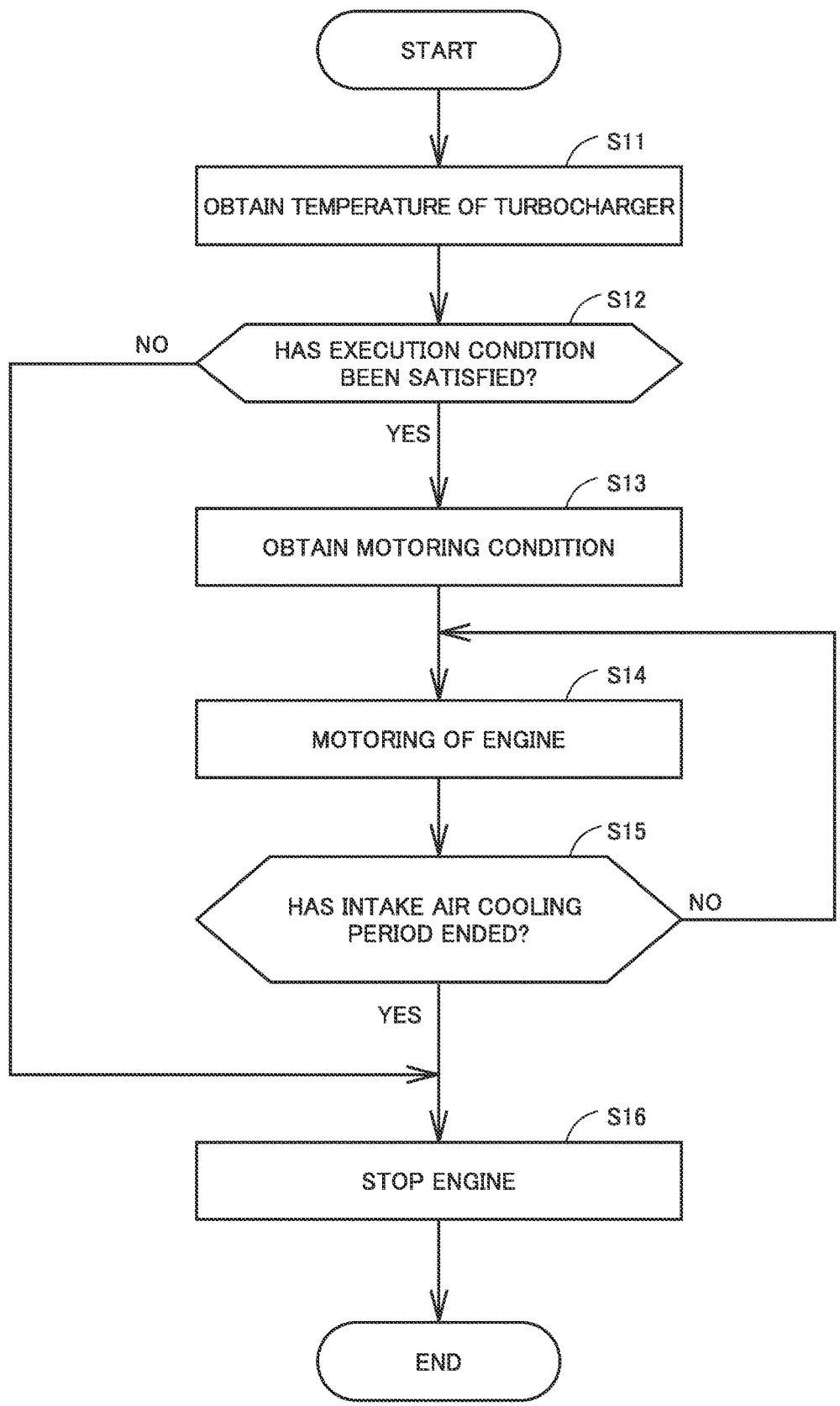
FIG. 10 is a flowchart for illustrating control carried out by the controller shown in FIG. 8 at the time of EV transition.

FIG. 10 is a flowchart for illustrating control carried out by HVECU 62 at the time of EV transition. A process shown in the flowchart is started when a notification that the traveling mode of the vehicle has made transition from the HV traveling mode to the EV traveling mode is output from traveling mode decision unit 621 to each of condition determination unit 623 and traveling control unit 626. Control of traveling by traveling control unit 626 may be carried out in parallel to the process in FIG. 10 (not shown).

Referring to FIG. 10 together with FIG. 8, in a step (which is also simply denoted as "S" below) 11, temperature estimation unit 622 outputs a signal indicating a temperature of turbocharger 47 (for example, any of the low-temperature signal and the high-temperature signal described previously) to condition determination unit 623. Temperature estimation unit 622 outputs a detection value from turbocharger temperature sensor 79 (FIG. 3) to condition decision unit 624.

In S12, condition determination unit 623 determines whether or not the execution condition has been satisfied based on the signal obtained in S11.

When the signal obtained in S11 is the low-temperature signal, condition determination unit 623 determines that the execution condition has not been satisfied (NO in S12) and the process proceeds to S16. When execution unit 625 stops engine 13 in S16, a series of processing in FIG. 10 ends.

When the signal obtained in S11 is the high-temperature signal, condition determination unit 623 determines that the execution condition has been satisfied (YES in S12) and the process proceeds to S13. Execution unit 625 obtains a motoring condition (for example, the engine rotation speed in motoring described previously and the cooling time period) from condition decision unit 624 in S13, and performs motoring of engine 13 in S14 under the motoring condition. As the motoring is started in the processing in S14, the intake air cooling period is started.

Execution unit 625 determines in S15 whether or not the intake air cooling period has ended. For example, execution unit 625 determines whether or not the cooling time period obtained in S13 has elapsed since start of motoring. During a period from start of motoring until lapse of the cooling time period (that is, while determination as NO is made in S15), motoring of engine 13 (S14) is continued.

When the cooling time period has elapsed since start of motoring, the intake air cooling period is determined as having ended (YES in S15) and the process proceeds to S16. Execution unit 625 quits motoring in S16 and stops engine 13. The series of processing in FIG. 10 thus ends.

Figure 11:
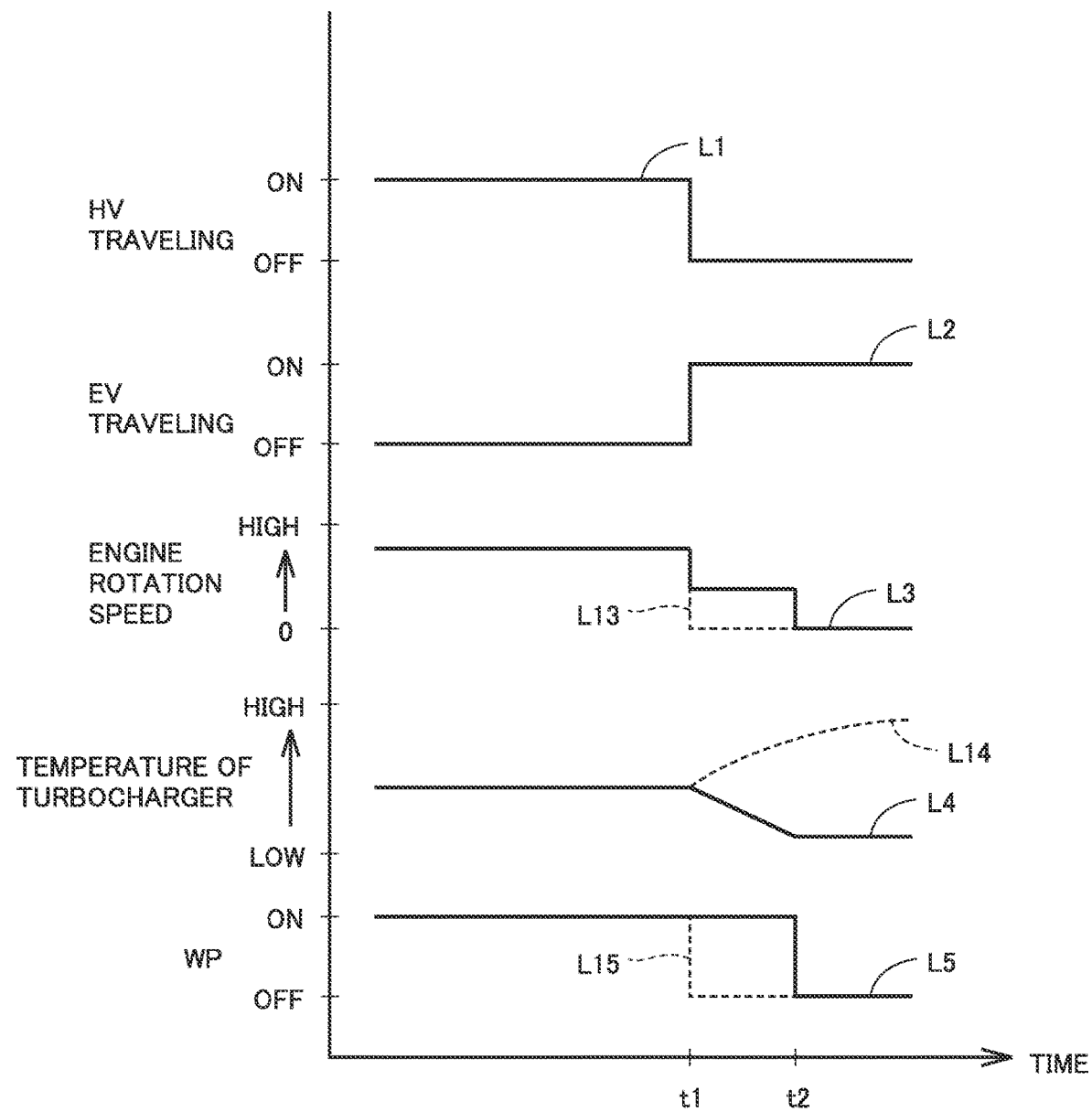
FIG. 11 is a diagram for illustrating an operation by the hybrid vehicle according to the embodiment of the present disclosure.

FIG. 11 is a diagram for illustrating an operation by the vehicle at the time of EV transition. In FIG. 11, EV transition is made at timing t1 and a period from t1 to t2 is defined as the intake air cooling period. Solid lines L3 to L5 represent transition of a state in an example where motoring of engine 13 is performed for the intake air cooling period. Dashed lines L13 to L15 represent transition of a state in an example where motoring of engine 13 is not performed at the time of EV transition. "WP" in FIG. 11 represents water pump 90 (FIG. 4).

Referring to FIG. 11 together with FIGS. 1 and 4, as shown with lines L1 and L2, at timing t1, HV traveling is quitted and EV traveling is started. When motoring of engine 13 is performed for the intake air cooling period, as shown with solid line L3, rotation of engine 13 is continued without being stopped for the period from t1 to t2. Since engine 13 is being rotated, turbocharger 47 can be cooled by intake air. For the period from t1 to t2, water pump 90 is driven by engine 13 as shown with solid line L5 and cooling water is circulated by water pump 90. Turbocharger 47 is cooled by a flow of cooling water through coolant flow path 47b.

When motoring of engine 13 is performed for the intake air cooling period as above, turbocharger 47 is cooled by intake air and cooling water for the period from t1 to t2. Therefore, as shown with solid line L4, the temperature of turbocharger 47 is lowered. When motoring of engine 13 is not performed at the time of EV transition, engine 13 and water pump 90 are stopped at timing t1 (see dashed lines L13 and L15). As turbocharger 47 is no longer cooled at timing t1, the temperature of turbocharger 47 increases (see dashed line L14).

In the hybrid vehicle according to the embodiment, rotation shafts (for example, rotor shafts 23 and 30) of MGs 14 and 15 are mechanically coupled to output shaft 22 of engine 13 with planetary gear mechanism 20 (that is, the planetary gear) being interposed (see FIG. 1). When the execution condition is satisfied at the time of EV transition, HVECU 62 controls MGs 14 and 15 in coordination to perform motoring of engine 13 and thereafter stops engine 13. By performing motoring before stop of engine 13 (more specifically, immediately before stop), turbocharger 47 can be cooled. Overheating of the turbocharger can thus be suppressed. When the execution condition is not satisfied at the time of EV transition, the temperature of turbocharger 47 at the time of EV transition is sufficiently low. Therefore, increase in temperature of turbocharger 47 after EV transition does not lead to overheating of turbocharger 47.

HVECU 62 of the hybrid vehicle according to the embodiment performs a method of cooling the turbocharger including steps A to C described below.

In step A, HVECU 62 determines whether or not a prescribed execution condition is satisfied at the time when the traveling mode of the hybrid vehicle makes transition from the HV traveling mode to the EV traveling mode (S12 in FIG. 10).

In step B, when HVECU 62 determines that the execution condition has been satisfied in step A (YES in S12 in FIG. 10), HVECU 62 performs motoring of engine 13 (S14 in FIG. 10).

In step C, when a prescribed quitting condition is satisfied (YES in S15 in FIG. 10) during motoring of engine 13, HVECU 62 stops engine 13 (S16 in FIG. 10).

With the method, by performing motoring before stop of engine 13 (more specifically, immediately before stop), turbocharger 47 can be cooled by intake air. Overheating of turbocharger 47 can thus be suppressed.

In the embodiment, instead of motoring of engine 13, engine 13 may perform the self-sustaining operation. In the configuration of HVECU 62 shown in FIG. 8, condition decision unit 624 may determine a condition for the self-sustaining operation. When execution unit 625 receives the notification that the execution condition is satisfied from condition determination unit 623, it may control engine 13 to perform the self-sustaining operation under the condition determined by condition decision unit 624. The condition for the self-sustaining operation is a condition concerning the self-sustaining operation of engine 13 executed by execution unit 625, and includes, for example, a condition for quitting the self-sustaining operation and the engine rotation speed during the self-sustaining operation. The condition for the self-sustaining operation may be determined similarly to the motoring condition described previously. The engine rotation speed during the self-sustaining operation may be equal to an engine rotation speed during idling.

Figure 12:
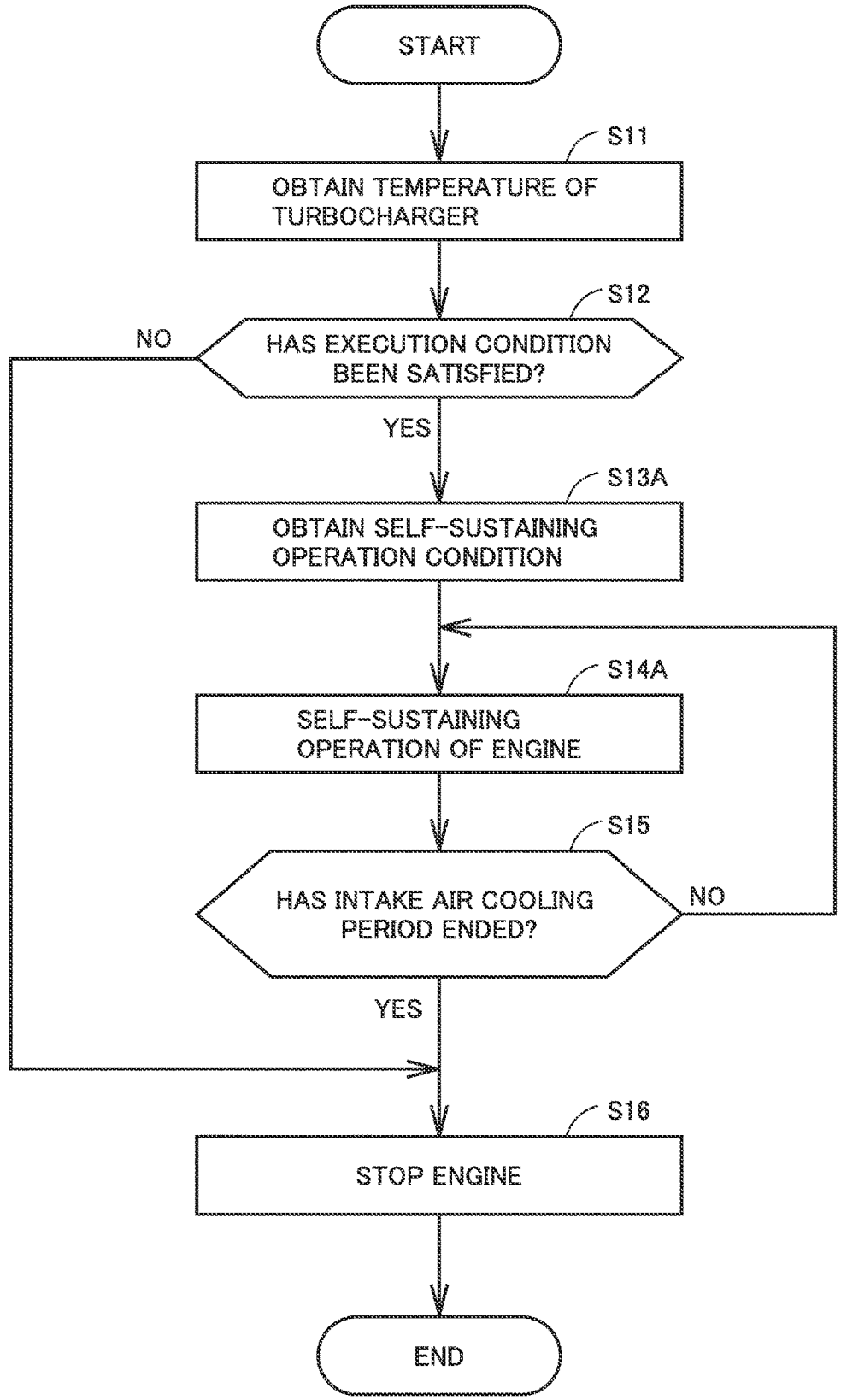
FIG. 12 is a flowchart showing a modification of a process shown in FIG. 10.

FIG. 12 is a flowchart showing a modification of the process shown in FIG. 10. Referring to FIG. 12, in this example, S13A and S14A are adopted instead of S13 and S14 in FIG. 10. In S13A, condition decision unit 624 determines the condition for the self-sustaining operation, and in S14A, execution unit 625 controls engine 13, MG 14, and MG 15 (FIG. 1) in coordination such that engine 13 performs the self-sustaining operation under the condition determined by condition decision unit 624. For example, execution unit 625 sets engine 13 to a self-sustaining operation state (that is, in a combustion state), performs EV traveling by means of MG 15, and adjusts the engine rotation speed by means of MG 14. During the self-sustaining operation, combustion energy of engine 13 is consumed for continuing rotation of engine 13. Though engine 13 during the self-sustaining operation does not generate traveling driving force, it generates motive power for driving auxiliary machinery (for example, oil pump 36 and water pump 90) connected to output shaft 22.

In the modification, the self-sustaining operation by engine 13 is performed for the intake air cooling period. By performing the self-sustaining operation before stop of engine 13, turbocharger 47 can be cooled by intake air and cooling water. Overheating of turbocharger 47 can thus be suppressed.

Figure 13:
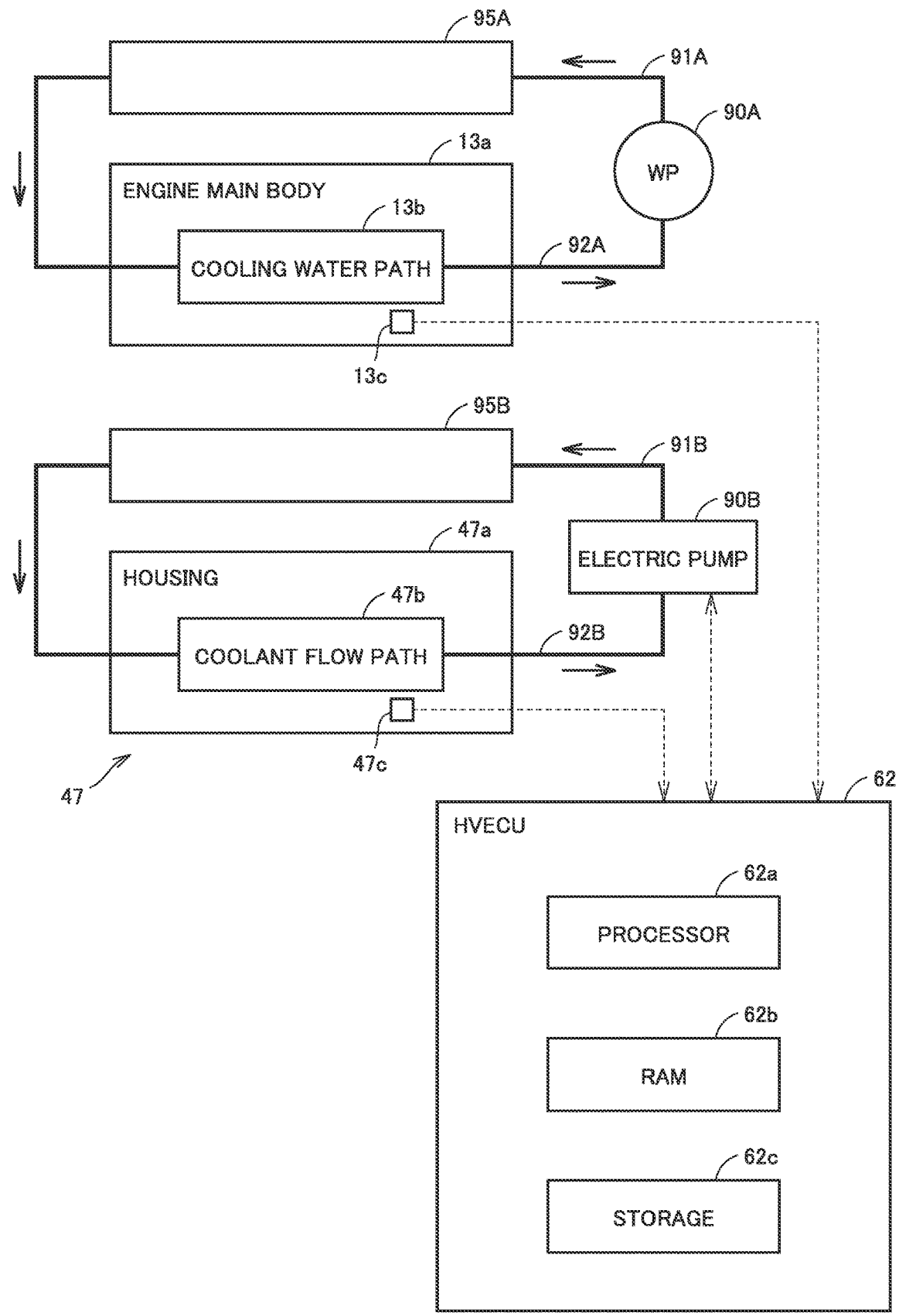
FIG. 13 is a diagram showing a modification of the cooling apparatus shown in FIG. 4.

The configuration of an apparatus for cooling engine main body 13a and turbocharger 47 is not limited to the configuration shown in FIG. 4. FIG. 13 is a diagram showing a modification of the cooling apparatus shown in FIG. 4.

Referring to FIG. 13, in this example, cooling water path 13b and coolant flow path 47b are not connected to each other. The vehicle includes a water pump 90A that circulates cooling water through cooling water path 13b and an electric pump 90B that circulates coolant through coolant flow path 47b.

Water pump 90A is a mechanical pump driven by engine 13 (FIG. 1). Water pump 90A has a discharge port connected to cooling water path 13b through a water path 91A. Cooling water path 13b is connected to a suction port of water pump 90A through a water path 92A. Water path 91A is provided with a heat exchanger 95A (for example, a radiator) that removes heat from cooling water that flows through water path 91A. Water pump 90A circulates cooling water through water path 91A, heat exchanger 95A, cooling water path 13b, and water path 92A. Temperature sensor 13c outputs a signal in accordance with an engine cooling water temperature (that is, a temperature of cooling water that flows through cooling water path 13b) to HVECU 62.

Electric pump 90B is driven by electric power supplied from battery 18 or another vehicle-mounted battery (for example, an auxiliary battery) that is not shown and controlled by HVECU 62. Electric pump 90B has a discharge port connected to coolant flow path 47b through a flow path 91B. Coolant flow path 47b is connected to a suction port of electric pump 90B through a flow path 92B. Flow path 91B is provided with a heat exchanger 95B (for example, a radiator) that removes heat from coolant that flows through flow path 91B. Electric pump 90B circulates coolant through flow path 91B, heat exchanger 95B, coolant flow path 47b, and flow path 92B. Temperature sensor 47c outputs a signal in accordance with a turbocharger coolant temperature (that is a temperature of coolant that flows through coolant flow path 47b) to HVECU 62. Water may be adopted as coolant or coolant other than water (for example, oil) may be adopted.

HVECU 62 may control electric pump 90B to circulate coolant when the execution condition is satisfied at the time of EV transition. During the intake air cooling period, turbocharger 47 is cooled also by circulation of coolant in addition to intake air supplied by the self-sustaining operation or motoring, so that overheating of turbocharger 47 can more reliably be suppressed.

Activation of electric pump 90B for the intake air cooling period is not essential. HVECU 62 may control electric pump 90B regardless of the traveling mode of the vehicle. For example, HVECU 62 may activate electric pump 90B when the detection value from turbocharger temperature sensor 79 (FIG. 3) is equal to or greater than a prescribed value and may turn off electric pump 90B when the detection value from temperature sensor 47c is smaller than the prescribed value.

Though MGs 14 and 15 are controlled in coordination to perform motoring of engine 13 in the embodiment, a motor for motoring of engine 13 (for example, a starter motor) may be provided instead of MG 14.

The configuration of engine 13 is not limited to the configuration shown in FIG. 2 and can be modified as appropriate. For example, throttle valve 49 may be provided between air flow meter 50 and compressor 48 in intake air passage 41. A layout of the cylinders is not limited to the in-line layout either, and may be a V layout or a horizontal layout. The number of cylinders and valves can also arbitrarily be modified.

A gasoline engine is adopted as engine 13 in the embodiment. Without being limited as such, any internal combustion engine can be adopted as engine 13 and a diesel engine can also be adopted.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A hybrid vehicle comprising:
   an engine and a motor that generate traveling driving force;

a power storage that supplies electric power to the motor; and a controller that controls the engine and the motor, the engine including
an engine main body where combustion is performed,
an intake air passage and an exhaust passage connected to the engine main body, and
a turbocharger, the turbocharger including
a compressor provided in the intake air passage, and
a turbine provided in the exhaust passage, the compressor and the turbine being rotated together, wherein when a prescribed condition is satisfied at time of transition from first traveling to second traveling, the controller controls the engine and the motor to perform motoring of the engine and thereafter stops the engine, the first traveling being performed by the engine and the motor with generation of traveling driving force by the engine, the second traveling being performed by the motor without generation of traveling driving force by the engine, and the controller sets a rotation speed of the engine during the motoring to be higher as a transition temperature is higher, the transition temperature being a temperature of the turbocharger at a time when the first traveling is quitted.

2. The hybrid vehicle according to claim 1, wherein the prescribed condition includes a condition that a temperature of the turbocharger is equal to or higher than a prescribed temperature.

3. The hybrid vehicle according to claim 1, wherein the controller extends a duration of the motoring as a transition temperature is higher, the transition temperature being a temperature of the turbocharger at time when the first traveling is quitted.

4. The hybrid vehicle according to claim 1, further comprising a pump, wherein
the turbocharger includes a housing having a coolant flow path through which a coolant for cooling the turbocharger flows,
the pump circulates the coolant through the coolant flow path, and
when the prescribed condition is satisfied at the time of transition from the first traveling to the second traveling, the controller controls the pump to circulate the coolant.

5. The hybrid vehicle according to claim 4, wherein the pump is a mechanical pump driven by the engine.

6. The hybrid vehicle according to claim 4, wherein the pump is an electric pump.

7. The hybrid vehicle according to claim 1, further comprising a first motor generator, wherein
the motor is a second motor generator,
each of the first motor generator and the second motor generator has a rotation shaft mechanically coupled to an output shaft of the engine with a planetary gear being interposed, and
when the prescribed condition is satisfied at the time of transition from the first traveling to the second traveling, the controller controls the first and second motor generators in coordination to perform the motoring of the engine by the first and second motor generators.

8. A method of cooling a turbocharger performed in a hybrid vehicle, the hybrid vehicle including an engine and a motor that generate traveling driving force, a power storage that supplies electric power to the motor, and a controller that controls the engine and the motor, the engine including an engine main body where combustion is performed, an intake air passage and an exhaust passage connected to the engine main body, and a turbocharger, the turbocharger including a compressor provided in the intake air passage and a turbine provided in the exhaust passage, the compressor and the turbine being rotated together, the method comprising: by the controller, determining whether a prescribed execution condition is satisfied at time of transition from a first traveling mode to a second traveling mode, the hybrid vehicle being driven by the engine and the motor with generation of traveling driving force by the engine in the first traveling mode, the hybrid vehicle being driven by the motor without generation of traveling driving force by the engine in the second traveling mode;

performing a self-sustaining operation or motoring of the engine when the execution condition is satisfied, the self-sustaining operation being an operation state of the engine in which combustion energy of the engine is consumed for continuing rotation of the engine and traveling driving force is not output;

setting a rotation speed of the engine during the self-sustaining operation or the motoring to be higher as a transition temperature is higher, the transition temperature being a temperature of the turbocharger at time when the HV traveling is quitted; and stopping the engine when a prescribed quitting condition is satisfied during the self-sustaining operation or the motoring of the engine.

9. A hybrid vehicle comprising:
an engine and a motor that generate traveling driving force;
a power storage that supplies electric power to the motor; and
a controller that controls the engine and the motor,
the engine including
an engine main body where combustion is performed,
an intake air passage and an exhaust passage connected to the engine main body, and
a turbocharger,
the turbocharger including
a compressor provided in the intake air passage, and
a turbine provided in the exhaust passage, the compressor and the turbine being rotated together, wherein when a prescribed condition is satisfied at time of transition from first traveling to second traveling, the controller controls the engine and the motor to perform a self-sustaining operation of the engine and thereafter stops the engine, the first traveling being performed by the engine and the motor with generation of traveling driving force by the engine, the second traveling being performed by the motor without generation of traveling driving force by the engine, the self-sustaining operation being an operation state of the engine in which combustion energy of the engine is consumed for continuing rotation of the engine and traveling driving force is not output, and the controller sets a rotation speed of the engine during the self-sustaining operation to be higher as a transition temperature is higher, the transition temperature being a temperature of the turbocharger at time when the first traveling is quitted.

10. The hybrid vehicle according to claim 9, wherein
in the self-sustaining operation, the engine is operated within a prescribed rotation speed range, the prescribed rotation speed range being a speed range from 500 rpm to 1200 rpm.

11. The hybrid vehicle according to claim 9, wherein
the prescribed condition includes a condition that a temperature of the turbocharger is equal to or higher than a prescribed temperature.

12. The hybrid vehicle according to claim 9, wherein
the controller extends a duration of the self-sustaining operation as a transition temperature is higher, the transition temperature being a temperature of the turbocharger at time when the first traveling is quitted.

13. The hybrid vehicle according to claim 9, further comprising a pump, wherein
the turbocharger includes a housing having a coolant flow path through which a coolant for cooling the turbocharger flows,
the pump circulates the coolant through the coolant flow path, and
when the prescribed condition is satisfied at the time of transition from the first traveling to the second traveling, the controller controls the pump to circulate the coolant.

14. The hybrid vehicle according to claim 13, wherein
the pump is a mechanical pump driven by the engine.

15. The hybrid vehicle according to claim 13, wherein
the pump is an electric pump.

\* \* \* \* \*